(12) United States Patent
Tsuyuki et al.

(10) Patent No.: US 10,280,858 B2
(45) Date of Patent: May 7, 2019

(54) ENGINE CONTROL DEVICE AND ENGINE CONTROL METHOD

(71) Applicant: NISSAN MOTOR CO., LTD., Yokohama-shi, Kanagawa (JP)

(72) Inventors: Takeshi Tsuyuki, Kanagawa (JP); Yoshihiro Imaoka, Kanagawa (JP); Ryo Uchida, Kanagawa (JP); Takao Inoue, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/567,387

(22) PCT Filed: Apr. 20, 2015

(86) PCT No.: PCT/JP2015/062014
§ 371 (c)(1),
(2) Date: Oct. 18, 2017

(87) PCT Pub. No.: WO2016/170583
PCT Pub. Date: Oct. 27, 2016

(65) Prior Publication Data
US 2018/0135546 A1   May 17, 2018

(51) Int. Cl.
*F02D 41/06* (2006.01)
*F02D 13/02* (2006.01)
(Continued)

(52) U.S. Cl.
CPC .......... *F02D 41/064* (2013.01); *F02D 13/02* (2013.01); *F02D 13/0203* (2013.01);
(Continued)

(58) Field of Classification Search
CPC .. F02D 13/0261; F02D 35/025; F02D 35/026; F02D 41/0255
See application file for complete search history.

(56) References Cited

U.S. PATENT DOCUMENTS 5,230,320 A * 7/1993 Hitomi ................. F01L 1/26
123/308
6,640,758 B2 * 11/2003 Ashida ................. F01L 1/34
123/90.15

(Continued)

FOREIGN PATENT DOCUMENTS

DE    102004016386 A1   10/2005
JP    2006-258023 A     9/2006
(Continued)

*Primary Examiner* — Sizo B Vilakazi
*Assistant Examiner* — Kevin R Steckbauer
(74) *Attorney, Agent, or Firm* — Drinker Biddle & Reath LLP

(57) ABSTRACT

An engine control device controls a cylinder direct fuel injection type spark ignition engine provided with a fuel injection valve configured to directly inject fuel into a cylinder and an ignition plug configured to perform spark ignition for a gas mixture inside the cylinder. The engine control device executes a catalyst warm-up operation for retarding an ignition timing, during a compression stroke of the fuel injection timing, in a case where it is necessary to warm up an exhaust gas purifying catalyst inserted into an exhaust passage. In addition, the engine control device increases a valve overlap period as a piston crown surface temperature increases during execution of the catalyst warm-up operation.

5 Claims, 9 Drawing Sheets

(51) Int. Cl.
*F02D 37/02* (2006.01)
*F02P 5/04* (2006.01)
*F02D 41/00* (2006.01)
*F02D 41/02* (2006.01)
*F02D 41/04* (2006.01)
*F02D 41/30* (2006.01)
*F02D 41/34* (2006.01)
*F02D 35/02* (2006.01)

(52) U.S. Cl.
CPC ....... *F02D 13/0261* (2013.01); *F02D 35/026* (2013.01); *F02D 37/02* (2013.01); *F02D 41/006* (2013.01); *F02D 41/0245* (2013.01); *F02D 41/0255* (2013.01); *F02D 41/047* (2013.01); *F02D 41/06* (2013.01); *F02D 41/068* (2013.01); *F02D 41/3029* (2013.01); *F02D 41/345* (2013.01); *F02P 5/045* (2013.01); *F02D 2013/0292* (2013.01); *F02D 2200/0616* (2013.01); *F02D 2200/0618* (2013.01); *Y02T 10/18* (2013.01); *Y02T 10/26* (2013.01); *Y02T 10/44* (2013.01); *Y02T 10/47* (2013.01)

(56) References Cited

U.S. PATENT DOCUMENTS

| | | | | |
|---|---|---|---|---|
| 6,772,720 | B2* | 8/2004 | Majima | F01L 9/04 123/90.15 |
| 7,406,942 | B2* | 8/2008 | Ashizawa | F02B 23/101 123/295 |
| 7,451,739 | B2* | 11/2008 | Yasui | F01L 13/0063 123/406.19 |
| 7,726,289 | B2* | 6/2010 | Murase | F01L 1/34 123/491 |
| 8,096,286 | B2* | 1/2012 | Asai | F02D 17/02 123/198 F |
| 8,433,501 | B2* | 4/2013 | Honda | F02D 35/025 123/299 |
| 9,316,150 | B2* | 4/2016 | Cleeves | F02D 15/02 |
| 9,599,068 | B2* | 3/2017 | Nishida | F01L 1/34 |
| 9,903,322 | B2* | 2/2018 | Kassai | F02D 41/068 |
| 9,945,297 | B2* | 4/2018 | Tsuyuki | F02D 41/10 |
| 2002/0174841 | A1* | 11/2002 | Ashida | F01L 1/34 123/90.15 |
| 2003/0070637 | A1* | 4/2003 | Majima | F01L 9/04 123/90.15 |
| 2003/0182931 | A1 | 10/2003 | Sonoda et al. | |
| 2006/0266313 | A1 | 11/2006 | Ishikawa et al. | |
| 2007/0062470 | A1* | 3/2007 | Ashizawa | F02B 23/101 123/90.15 |
| 2007/0235007 | A1* | 10/2007 | Yasui | F01L 13/0063 123/406.23 |
| 2009/0101115 | A1* | 4/2009 | Murase | F01L 1/34 123/491 |
| 2010/0063710 | A1* | 3/2010 | Asai | F02D 17/02 701/103 |
| 2010/0193594 | A1* | 8/2010 | Moser | G05D 23/19 236/93 R |
| 2011/0118956 | A1* | 5/2011 | Honda | F02D 35/025 701/103 |
| 2014/0000567 | A1* | 1/2014 | Cleeves | F02D 15/02 123/48 R |
| 2014/0290597 | A1* | 10/2014 | Rumpsa | F02M 63/0265 123/41.02 |
| 2014/0297159 | A1 | 10/2014 | Surnilla et al. | |
| 2015/0013637 | A1* | 1/2015 | Kassai | F02D 41/068 123/294 |
| 2015/0136097 | A1* | 5/2015 | Hoshi | F02D 19/0615 123/575 |
| 2016/0131087 | A1* | 5/2016 | Nishida | F01L 1/34 123/25 A |
| 2018/0073445 | A1* | 3/2018 | Tsuyuki | F02D 41/10 |
| 2018/0080400 | A1* | 3/2018 | Imaoka | F02D 41/06 |

FOREIGN PATENT DOCUMENTS

| | | |
|---|---|---|
| JP | 2006-299816 A | 11/2006 |
| JP | 2006-329144 A | 12/2006 |
| JP | 2009-228588 A | 10/2009 |
| JP | 2012-255366 A | 12/2012 |
| JP | 2014-136989 A | 7/2014 |
| JP | 5590467 B2 | 8/2014 |
| WO | WO-2013/133112 A1 | 9/2013 |

* cited by examiner

ENGINE CONTROL DEVICE AND ENGINE CONTROL METHOD

TECHNICAL FIELD

The present invention relates to an engine control device and an engine control method for controlling a cylinder direct fuel injection type spark ignition engine.

BACKGROUND ART

In order to suppress degradation of emission during a cold engine operation, a control is discussed in JP2006-329144A, in which a valve overlap period is changed depending on an operation state at the time of an engine start. In this control in a port injection type engine, vaporization of a liquefied fuel adhered on an intake port wall is promoted using a burned gas blowing back to an intake port during the valve overlap period. A temperature of the intake port increases depending on a coolant temperature. Therefore, if the coolant temperature increases as time elapses from the engine start, the temperature of the intake port also increases. In this regard, in the control discussed in the aforementioned document, the valve overlap period is controlled so as to gradually shorten as the coolant temperature increases.

SUMMARY OF INVENTION

However, in the case of a cylinder direct injection type spark ignition engine in which fuel is directly injected into the inside of the cylinder, a wall flow is not generated in the port, but a part of the fuel colliding with the piston crown surface is liquefied in some cases. In particular, in an engine in which a stratified mixture is formed around an ignition plug using a cavity provided on the piston crown surface in a cold engine operation, and stratified charge combustion is performed at an ignition timing after a compression top dead center, the liquefied fuel is slowly accumulated in the cavity without being combusted during the corresponding combustion cycle in some cases. If the liquid fuel accumulated in this way is ignited by a combustion flame during the subsequent engine operation, a discharge amount of an exhaust gas particulate matter (PM) (hereinafter, also referred to as a "particulate number (PN)") increases. In this regard, in order to suppress degradation of emission during a cold engine operation of a cylinder direct injection type spark ignition engine, it is necessary to suppress accumulation of the liquefied fuel on the piston crown surface. In this manner, the port injection type engine and the cylinder direct injection type spark ignition engine are different from each other in a portion to be heated during a cold engine operation and a purpose of the temperature increase. Therefore, in the control discussed in the aforementioned document, it may be difficult to obtain an effect of suppressing accumulation of the liquid fuel during a cold engine operation of a cylinder direct injection type spark ignition engine, that is, it is difficult to suppress an increase of the PN.

In view of the aforementioned problems, it is therefore an object of the present invention to control the cylinder direct injection type spark ignition so as to suppress an increase of the PN.

According to one embodiment of this invention, there is provided an engine control device for controlling a cylinder direct fuel injection type spark ignition engine provided with a fuel injection valve configured to directly inject fuel into a cylinder and an ignition plug configured to perform spark ignition for a gas mixture inside the cylinder. The engine control device executes a catalyst warm-up operation for retarding an ignition timing in a case where it is necessary to warm up an exhaust gas purifying catalyst inserted into an exhaust passage. The engine control device increases a valve overlap period as a piston crown surface temperature increases during execution of the catalyst warm-up operation.

DESCRIPTION OF EMBODIMENTS

Embodiments of the present invention will now be described with reference to the accompanying drawings.

Figure 1:
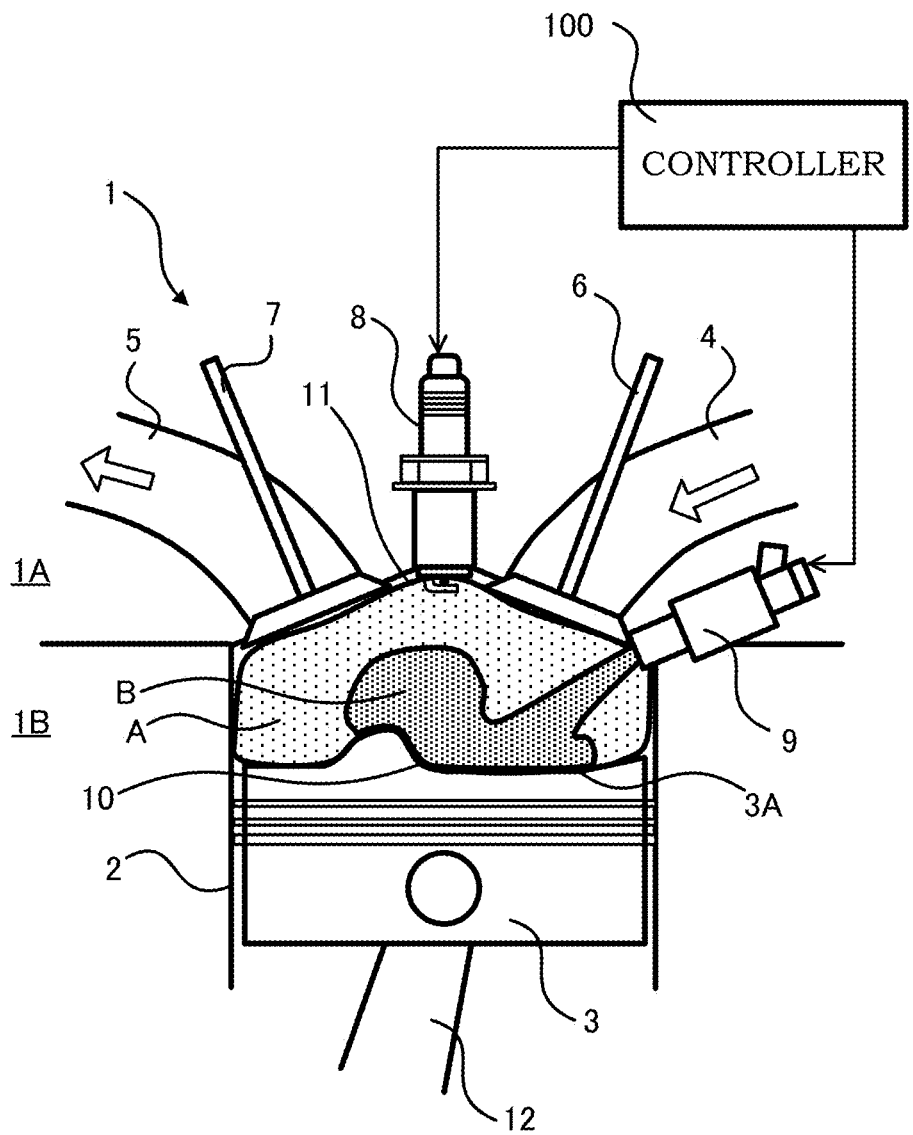
FIG. 1 is a schematic diagram illustrating an engine according to a first embodiment.

FIG. 1 is a schematic diagram illustrating a combustion chamber of a cylinder direct fuel injection type spark ignition engine 1 according to this embodiment (hereinafter, also referred to as an "engine") and its vicinity. Note that, although FIG. 1 illustrates a single cylinder, this embodiment is also applicable to a multi-cylinder engine.

A cylinder block 1B of the engine 1 is provided with a cylinder 2. A piston 3 is reciprocatably housed in the cylinder 2. The piston 3 is connected to a crankshaft (not shown) through a connecting rod 12, so that it reciprocates by rotating the crankshaft. In addition, the piston 3 has a cavity 10 formed on a top surface 3A (hereinafter, also referred to as a piston crown surface 3A) as described below.

A cylinder head 1A of the engine 1 has a hollowed combustion chamber 11. The combustion chamber 11 is a so-called pent roof type, in which pair of intake valves 6 are provided on a slope surface of the intake side, and pair of exhaust valves 7 are provided on a slope surface of the exhaust side, respectively. In addition, an ignition plug 8 is arranged in a substantial center position of the combustion chamber 11 surrounded by a pair of intake valves 6 and a pair of exhaust valves 7 along an axial line of the cylinder 2.

In addition, in a position of the cylinder head 1A, which is sandwiched by the pair of intake valves 6 are inserted, the fuel injection valve 9 is arranged to face the combustion chamber 11. A directivity of the fuel spray injected from the fuel injection valve 9 will be described below.

The intake valve 6 and the exhaust valve 7 are driven by a valve timing control mechanism (not shown). As the valve timing control mechanism, any mechanism may be employed as long as valve timings of the intake valve 6 and the exhaust valve 7, that is, a valve open timing and a valve close timing can be changed so as to generate a valve overlap period in which both the intake valve 6 and the exhaust valve 7 are open. Note that the valve open timing refers to a timing for initiating a valve open operation, and the valve close timing refers to a timing for terminating a valve close operation. According to this embodiment, a valve timing control mechanism well known in the art for changing the rotational phases of a cam shaft driving the intake valve 6 and a cam shaft driving the exhaust valve 7 with respect to the crankshaft is used. Note that a valve timing control mechanism well known in the art, capable of changing operation angles as well as the rotational phases of the intake valve and the exhaust valve, may also be employed.

An exhaust gas purifying catalyst for purifying the exhaust gas of the engine 1 is disposed on the downstream side of the exhaust gas flow of the exhaust passage 5. The exhaust gas purifying catalyst is, for example, a three-way catalyst.

The piston 3 is provided with the cavity 10 on the piston crown surface 3A as described above. The cavity 10 is provided in a position biased to the intake side of the piston crown surface 3A. In addition, the fuel injection valve 9 is placed such that a fuel spray is directed to the cavity 10 when fuel is injected in the vicinity of the top dead center of the piston 3. The fuel spray colliding with the cavity 10 swirls upward along a wall surface of the cavity 10 and is directed to the ignition plug 8.

Note that a fuel injection amount, a fuel injection timing, an ignition timing, and the like of the engine 1 are controlled by a controller 100 according to an operation state of the engine 1. Note that the fuel injection timing refers to a timing for initiating fuel injection. In addition, in order to execute this control, the engine 1 is provided with various detectors such as a crankshaft angle sensor, a coolant temperature sensor, and an air flowmeter for detecting the intake air amount.

Next, a control performed at the start of the engine 1 executed by the controller 100 will be described. In this embodiment, it is assumed that a fuel amount necessary for one combustion cycle is injected dividingly in two times. That is, so-called two-stage injection is performed.

The exhaust gas purifying catalyst does not provide a sufficient purification performance at a temperature lower than the activation temperature. For this reason, during a cold start operation in which the exhaust gas purifying catalyst has a temperature lower than the activation temperature, it is necessary to increase the temperature of the exhaust gas purifying catalyst earlier. For this purpose, the controller 100 executes super-retard stratified charge combustion in order to activate the exhaust gas purifying catalyst earlier when the exhaust gas purifying catalyst has an inactive state in an idling operation immediately after the cold starting. Note that the super-retard stratified charge combustion is well known in the art (refer to JP 2008-25535 A).

In the super-retard stratified charge combustion, the controller 100 sets the ignition timing within a first half of an expansion stroke, for example, to 15 to 30° after the compression top dead center. In addition, the controller 100 sets the first fuel injection timing to a first half of the intake stroke and sets the second fuel injection timing within a second half of the compression stroke at the timing capable of allowing the fuel spray to reach the vicinity of the ignition plug 8 until the ignition timing. For example, the second fuel injection timing is set to 50 to 60° preceding the compression top dead center.

Here, the first fuel injection amount and the second fuel injection amount will be described.

An air-fuel ratio of the exhaust gas discharged in the super-retard stratified charge combustion described above is stoichiometric (a stoichiometric air-fuel ratio). Similar to a general method for setting the fuel injection amount, the controller 100 calculates a fuel amount by which the fuel can be totally combusted with the intake air amount per one combustion cycle (hereinafter, also referred to as a total fuel amount). A part of this total fuel amount, for example, 50 to 90 weight % is used as the first injection amount, and the remaining fuel amount is used as the second injection amount.

If the fuel injection amount is set as described above, the fuel spray injected in the first fuel injection is diffused inside the cylinder 2 without colliding with the cavity 10 and is mixed with the air to form a homogeneous gas mixture leaner than the stoichiometric state in the entire area of the combustion chamber 11. In addition, the fuel spray injected in the second fuel injection collides with the cavity 10 and swirls upward, so that it reaches the vicinity of the ignition plug 8, and a gas mixture richer than the stoichiometric state is concentrated in the vicinity of the ignition plug 8. As a result, the gas mixture inside the combustion chamber 11 becomes a stratified state. If spark ignition is generated by the ignition plug 8 in this state, combustion resistant to a disturbance is performed while suppressing generation of accidental fire or smoke. Although the aforementioned combustion is the stratified charge combustion, this combustion will be referred to as "super-retard stratified charge combustion" in order to distinguish from typical stratified charge combustion in which the ignition timing precedes the compression top dead center.

In the super-retard stratified charge combustion described above, compared to the homogeneous stoichiometric combustion of the prior art, it is possible to increase the exhaust gas temperature and reduce a hydrocarbon (HC) discharge amount discharged from the combustion chamber 11 to the exhaust passage 5. That is, using the super-retard stratified charge combustion, it is possible to implement early activation of the exhaust gas purifying catalyst while suppressing hydrocarbon from being discharged to the atmosphere until the activation of the exhaust gas purifying catalyst from the starting initiation, compared to a case where only the homogeneous stoichiometric combustion of the prior art is performed, a case where only the stratified charge combustion is performed, or a case where additional fuel is injected in addition to the homogeneous stoichiometric combustion and the stratified charge combustion after a second half of the combustion (after the expansive stroke or during the exhaust stroke), to perform a warm-up operation.

Meanwhile, a part of the fuel colliding with the piston crown surface 3A during execution of the super-retard stratified charge combustion does not swirl toward the ignition plug 8 and is adhered to the piston crown surface 3A. Even when the fuel is adhered to the piston crown surface 3A, the fuel does not remain on the piston crown surface 3A if the adhered fuel is vaporized and combusted in the corresponding combustion cycle. However, since the super-retard stratified charge combustion is executed during the cold starting, it is difficult to vaporize the adhered fuel until the temperature of the piston crown surface 3A increases. Furthermore, the fuel does not remain on the piston crown surface 3A if the adhered fuel is combusted as a combustion flame propagates during the combustion cycle. However, since the combustion is initiated during the expansion stroke in the super-retard stratified charge combustion, the combustion flame does not reach the piston crown surface 3A. Even if it reaches the piston crown surface 3A, the temperature decreases in the second half of the expansion stroke. Therefore, it is difficult to burn out the adhered fuel during the corresponding cycle. Note that a phenomenon in which the liquid fuel remaining on the piston crown surface 3A is ignited and combusted by the combustion flame is called "pool fire."

Therefore, for a predetermined period after the cold starting, the amount of the liquid fuel remaining on the piston crown surface 3A continuously increases. Here, the predetermined period refers to a period until the amount of the liquid fuel remaining on the piston crown surface 3A vaporized during one combustion cycle is larger than the amount of the fuel adhered to the piston crown surface 3A for one combustion cycle.

That is, if the super-retard stratified charge combustion is continuously performed over the predetermined period, the amount of the liquid fuel remaining on the piston crown surface 3A is slowly reduced. However, in some cases, the super-retard stratified charge combustion is switched to the homogeneous stoichiometric combustion while the liquid fuel remains on the piston crown surface 3A before the predetermined time elapses. For example, this may happen when the exhaust gas purifying catalyst is activated, or when the accelerator pedal is depressed for acceleration. Note that the homogeneous stoichiometric combustion referred to herein is a combustion mode in which a gas mixture having a stoichiometric air-fuel ratio is formed in the entire combustion chamber 11, and spark ignition is performed at the optimum ignition timing (minimum advance for best torque (MBT)).

If the combustion mode is switched to the homogeneous stoichiometric combustion while the liquid fuel remains on the piston crown surface 3A, the combustion flame reaches the piston crown surface 3A at a high temperature to generate pool fire, so that the remaining liquid fuel is combusted. In this manner, if the liquid fuel accumulated until this combustion cycle is combusted, the PN tends to increase.

In this regard, according to this embodiment, in order to suppress an increase of the PN caused by the combustion of the liquid fuel, the controller 100 executes the following control.

Figure 2:
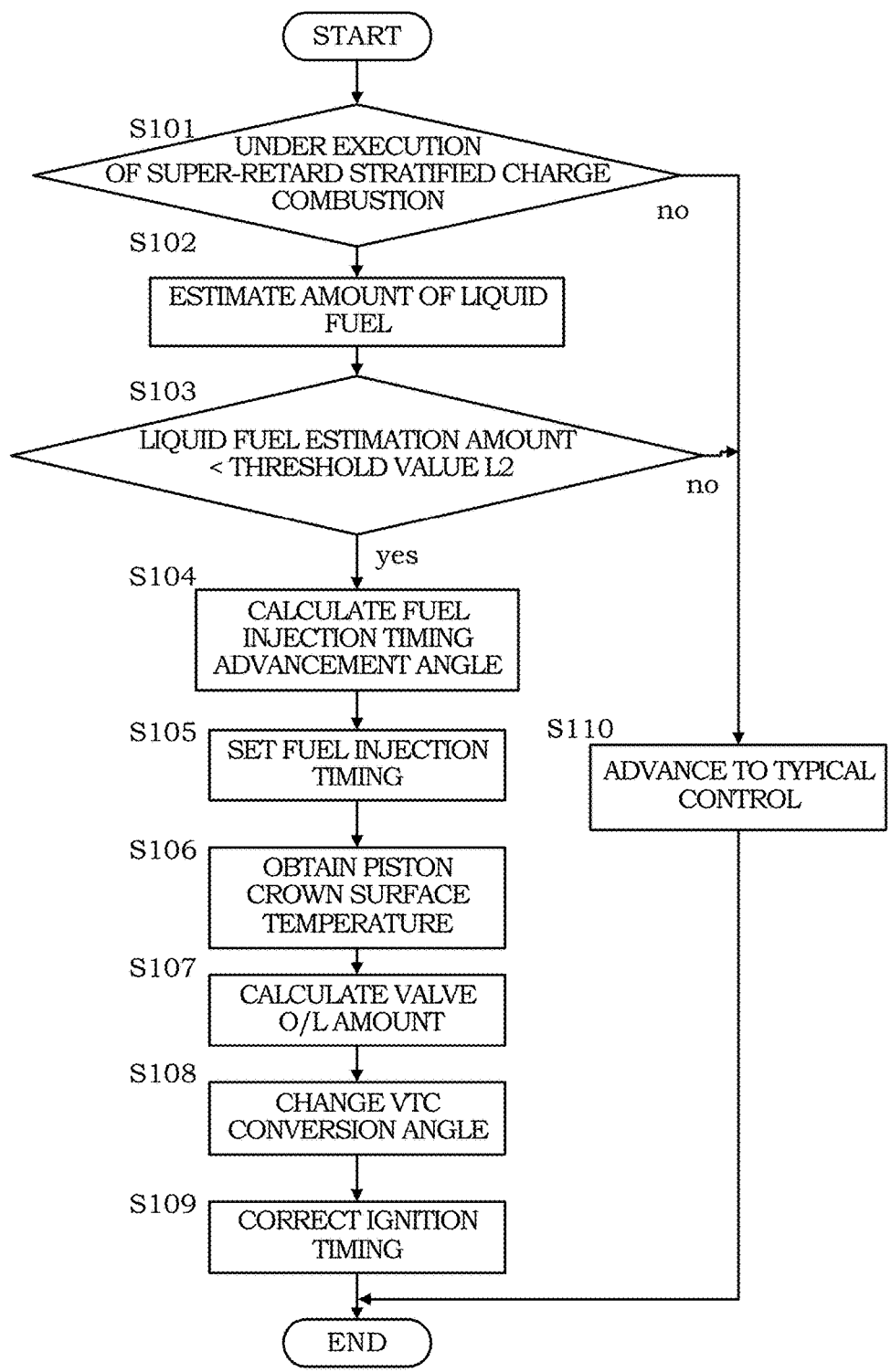
FIG. 2 is a flowchart illustrating a control routine for suppressing an increase of particulate number (PN)

FIG. 2 is a flowchart illustrating a control routine for suppressing an increase of eh PN executed by the controller 100. Note that this routine is repeatedly executed with a short interval, for example, 10 milliseconds.

In this routine, the second injection timing of the two-stage injection is changed according to the liquid fuel amount remaining on the piston crown surface 3A in order to suppress the liquid fuel amount remaining on the piston crown surface 3A (hereinafter, simply referred to as a "liquid fuel amount"). The steps of the flowchart will now be described.

In step S101, the controller 100 determines whether or not the super-retard stratified charge combustion is under execution. When the super-retard stratified charge combustion is under execution, the processing of step S102 is executed. Otherwise, when the super-retard stratified charge combustion is not under execution, a processing for switching to the homogeneous stoichiometric combustion (hereinafter, referred to as a typical control) is performed. Whether or not the super-retard stratified charge combustion is under execution is determined on the basis of a temperature of the exhaust gas purifying catalyst. Specifically, if the temperature of the exhaust gas purifying catalyst is lower than the activation temperature, it is deter mined that the super-retard stratified charge combustion is under execution. If the temperature of the exhaust gas purifying catalyst is equal to or higher than the activation temperature, it is determined that the super-retard stratified charge combustion is not under execution.

In step S102, the controller 100 estimates the liquid fuel amount. According to this embodiment, the liquid fuel amount is estimated on the basis of a wall temperature of the cylinder 2 (hereinafter, also referred to as a cylinder bore wall temperature) and a time elapsing from the engine starting. Specifically, first, on the basis of a fact that the liquid fuel more easily remains on the piston crown surface 3A as the cylinder bore wall temperature decreases, a remaining amount per unit time is established for each cylinder bore wall temperature, and the time elapsing from the engine starting is integrated into this value, so that the accumulated amount of the fuel adhered to the piston crown surface 3A is calculated. Then, a vaporization amount described below is subtracted from this accumulated amount, and its result is set as a liquid fuel estimation amount.

Note that, although the temperature of the piston crown surface 3A directly relates to easiness of the remaining liquid fuel, the cylinder bore wall temperature is employed here because it relates to the temperature of the piston crown surface 3A, and it can be estimated from a detection value of the existing coolant temperature sensor.

The aforementioned vaporization amount refers to the amount of fuel vaporized out of the fuel adhered to the piston crown surface 3A. Vaporization more easily occurs as the temperature of the fuel increases. Therefore, the vaporization amount increases as the temperature of the piston crown surface 3A increases.

In step S103, the controller 100 determines whether or not the liquid fuel amount estimated in step S102 (hereinafter, also referred to as a liquid fuel estimation amount) is smaller than a predetermined threshold value L2. When the liquid fuel estimation amount is smaller than the threshold value L2, the controller 100 executes the processing of step S104. Otherwise, when the liquid fuel estimation amount is equal to or larger than the threshold value L2, the processing of step S110 is executed.

The threshold value L2 employed in this step is a value that can satisfy the emission regulation value of the PN even when the combustion is switched from the super-retard stratified charge combustion to the homogeneous stoichiometric combustion.

In step S104, the controller 100 calculates an advancement angle of the second fuel injection timing of the two-stage injection (hereinafter, also referred to as a fuel injection timing advancement angle ADV) against a basic fuel injection timing as described below. The basic fuel injection timing is a timing during the compression stroke and at which the fuel spray collides with the cavity 10. A specific value of the basic fuel injection timing is set appropriately depending on a specification of a vehicle to which this embodiment is applied. According to this embodiment, the basic fuel injection timing is set to 50 to 60° preceding the compression top dead center as described above. Note that the unit of the "advancement angle" and the "retardation angle" according to this embodiment is a crank angle.

Figure 3:
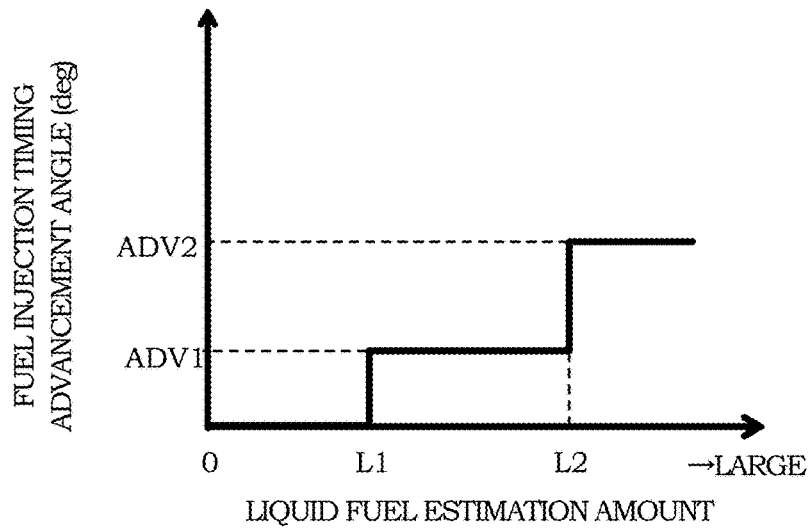
FIG. 3 is a table for setting a fuel injection timing advancement angle used in the control according to the first embodiment.

The fuel injection timing advancement angle ADV is calculated, for example, by preparing a table of FIG. 3 in advance, storing it in the controller 100, and searching this table using a liquid fuel estimation amount.

In FIG. 3, the ordinate refers to the fuel injection timing advancement angle ADV, and the abscissa refers to a liquid fuel estimation amount L. The fuel injection timing advancement angle ADV is set to zero if the liquid fuel estimation amount L is within a range "0≤L<threshold value L1." If the liquid fuel estimation amount L is within a range "threshold value L1≤L<threshold value L2," the fuel injection timing advancement angle ADV is set to "ADV1." If "L threshold value L2," the fuel injection timing advancement angle ADV is set to "ADV2." The fuel injection timing advancement angle ADV1 is set to a timing during the compression stroke and at which a part of the fuel spray collides with the cavity 10. The fuel injection timing advancement angle ADV2 is set to a timing at which the fuel spray does not collide with the cavity 10 during the intake stroke. The threshold value L1 is a predetermined value. A specific value of the threshold value L1 is set depending on a specification of a vehicle to which this embodiment is applied.

Alternatively, a table of the fuel injection timing advancement angle set for each temperature of the piston crown surface 3A may be prepared in advance, and a value of the table may be selected depending on the temperature of the piston crown surface 3A when the fuel injection timing advancement angle is calculated in step S104. In this case, the table is set such that the fuel injection timing advancement angle is set to be larger as the temperature of the piston crown surface decreases. That is, the fuel injection timing advancement angle of FIG. 3 is shifted upward as the temperature of the piston crown surface 3A decreases. Since the colliding fuel more easily remains as a liquid fuel as the temperature of the piston crown surface 3A decreases, it is possible to more reliably suppress an increase of the liquid fuel amount remaining on the piston crown surface 3A by calculating the fuel injection timing advancement angle ADV1 as described above.

In step S105, the controller 100 sets the fuel injection timing. Specifically, a new fuel injection timing is calculated from the basic fuel injection timing for the super-retard stratified charge combustion and the fuel injection timing advancement angle ADV calculated in step S104.

Figure 4:
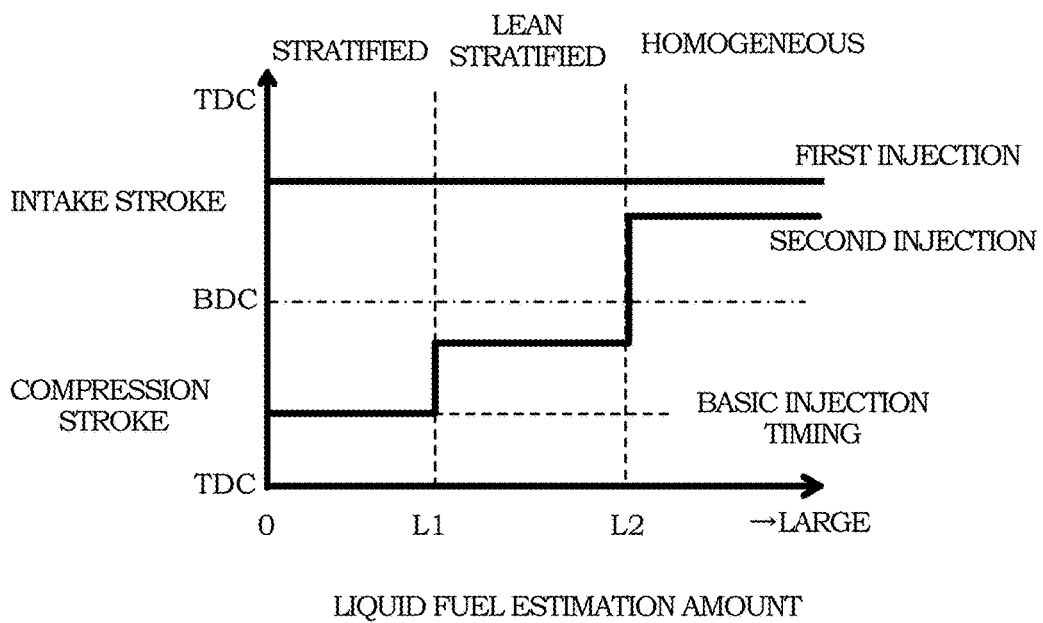
FIG. 4 is a diagram illustrating a fuel injection timing when the control according to the first embodiment is executed.

FIG. 4 is a diagram illustrating an exemplary fuel injection timing when the processing of steps S104 and S105 described above is executed. In FIG. 4, the ordinate refers to the crank angle, and the abscissa refers to the liquid fuel estimation amount L. If the liquid fuel estimation amount L is smaller than the threshold value L1, the fuel injection timing is still the basic injection timing.

If the liquid fuel estimation amount L is equal to or larger than the threshold value L1 and smaller than the threshold value L2, the fuel injection timing is advanced from the basic injection timing by the fuel injection timing advancement angle ADV1. In this case, a part of the fuel spray collides with the cavity 10 as described above. Therefore, a stratified mixture is formed in the vicinity of the ignition plug 8 although it is smaller relative to the case of the basic fuel injection timing. Combustion performed by generating spark ignition in this state is referred to as "lean stratified charge combustion."

If the liquid fuel estimation amount L is equal to or larger than the threshold value L2, intake stroke injection is performed while the fuel injection timing is advanced from the basic injection timing by the fuel injection timing advancement angle ADV2. If the intake stroke injection is performed, the fuel spray is diffused and mixed until the ignition timing, so that a homogeneous gas mixture is formed in the entire area of the cylinder. Therefore, the combustion mode becomes homogeneous stoichiometric combustion.

As described above, the controller 100 advances the fuel injection timing as the liquid fuel estimation amount L increases. More specifically, if the liquid fuel estimation amount L becomes equal to or larger than the threshold value L1, the controller 100 advances the fuel injection timing to switch to the lean stratified charge combustion. As a result, the fuel amount colliding with the cavity 10 is reduced, compared to the case of the super-retard stratified charge combustion. Therefore, it is possible to suppress an increase of the fuel amount remaining on the piston crown surface 3A. If the liquid fuel estimation amount L is equal to or larger than the threshold value L2, the controller 100 advances the fuel injection timing until the intake stroke and switches the combustion mode to the homogeneous stoichiometric combustion. As a result, the fuel spray is not adhered to the cavity 10. Therefore, it is possible to further suppress an increase of the fuel amount remaining on the piston crown surface.

Note that the controller 100 controls the ignition timing depending on an operation state in another routine (not shown). In addition, although the controller 100 retards the ignition timing to be later than the MBT in the case of the super-retard stratified charge combustion, the controller 100 also advances the ignition timing depending on the new fuel injection timing described above.

The description will return to the flowchart.

In step S106, the controller 100 obtains a piston crown surface temperature. Specifically, the controller 100 estimates the piston crown surface temperature on the basis of the cylinder bore wall temperature described above.

In step S107, the controller 100 calculates a valve overlap period on the basis of the piston crown surface temperature. Here, the valve overlap period refers to a period of time for maintaining the open states of the intake valve 6 and the exhaust valve 7 as expressed in terms of a crank angle.

Figure 5:
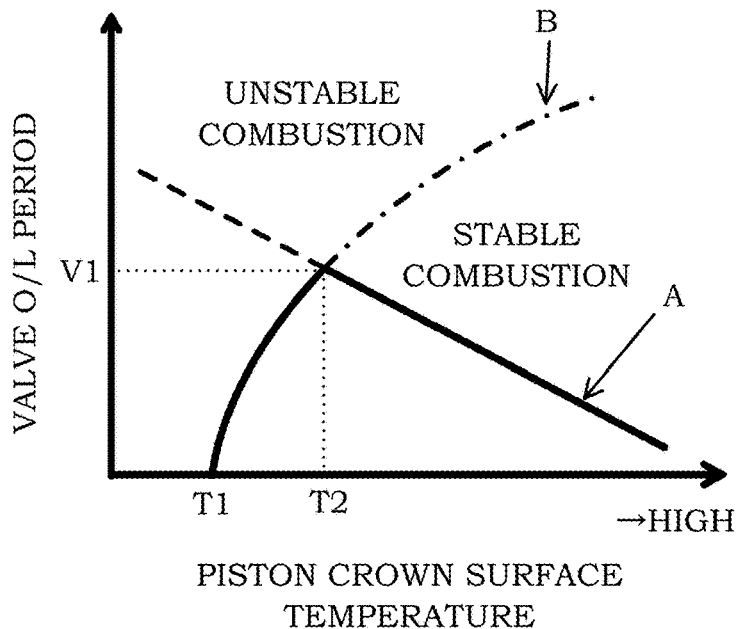
FIG. 5 is a table for setting a length of a valve overlap period used in the control according to the first embodiment.

FIG. 5 is a table used to calculate the valve overlap period in step S107. In FIG. 5, the ordinate refers to the valve overlap period, and the abscissa refers to the piston crown surface temperature. In addition, a curve B of FIG. 5 indicates a stable combustion limitation. If the valve overlap period is longer than the stable combustion limitation, combustion of the engine becomes unstable.

In FIG. 5, if the piston crown surface temperature is higher than "T2," the valve overlap period increases as the piston crown surface temperature decreases along a straight line A. Meanwhile, if the piston crown surface temperature is equal to or lower than "T2," the valve overlap period shortens as the piston crown surface temperature decreases along the curve B.

If the valve overlap period increases, a so-called internal exhaust gas recirculation (EGR) gas amount increases.

Therefore, an internal cylinder temperature from an intake stroke to an ignition timing increases. If the internal cylinder temperature increases, the piston crown surface temperature also increases. Therefore, the fuel colliding with the piston crown surface is not easily liquefied, and vaporization of the liquid fuel adhered to the cavity is promoted. Therefore, even when the piston crown surface temperature is originally equal to or lower than "T2" as indicated by the dotted line in FIG. 5, it is desirable to increase the valve overlap period as the piston crown surface temperature decreases. However, since an inert gas proportion inside the cylinder increases as the valve overlap period increases, the combustion becomes unstable. For this reason, in a part where the piston crown surface temperature is equal to or lower than "T2" in FIG. 5, the valve overlap period is set as long as possible within a range not exceeding the stable combustion limitation.

Therefore, for example, if the piston crown surface temperature in an engine start operation is between "T1" and "T2," the valve overlap period gradually increases as the piston crown surface temperature increases after the engine start. In addition, if the piston crown surface temperature exceeds "T2," the valve overlap period shortens as the piston crown surface temperature increases.

In step S108, the controller 100 sets a conversion angle of the valve timing control mechanism for implementing the valve overlap period calculated in step S107 and changes the valve overlap period. More specifically, the valve timings of the intake valve 6 and the exhaust valve 7 are calculated on the basis of the method described below, and the conversion angles of the intake-side and exhaust-side valve timing control mechanisms are changed on the basis of the calculation result.

Figure 6:
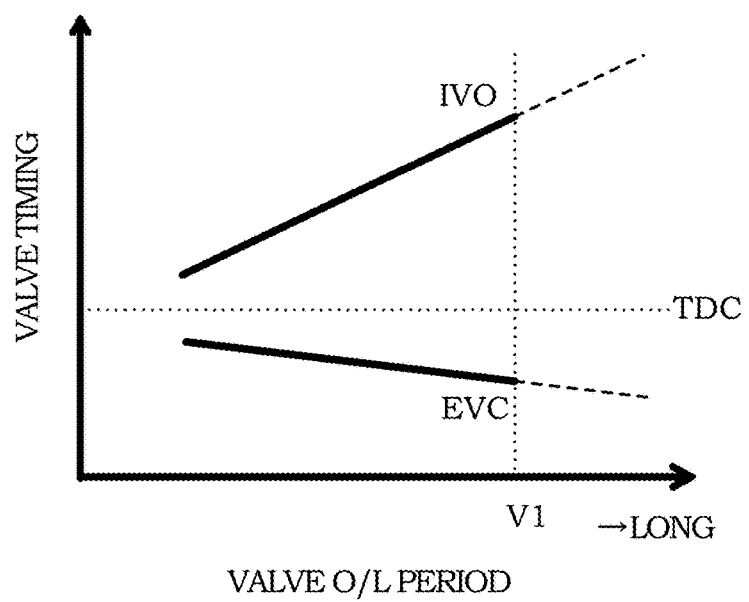
FIG. 6 is a table for setting a valve timing for implementing a valve overlap period calculated from the table of FIG. 5.

FIG. 6 is a table for calculating an open timing of the intake valve 6 (IVO in FIG. 6) and a close timing of the exhaust valve 7 (EVC in FIG. 6) for implementing the valve overlap period calculated in step S107. In FIG. 6, the ordinate refers to the valve timing, and the abscissa refers to the valve overlap period.

The valve timings of the intake valve 6 and the exhaust valve 7 are proportional to the valve overlap period. That is, as the valve overlap period increases, the advancement angle of the open timing of the intake valve 6 and the retardation angle of the close timing of the exhaust valve 7 increase. In addition, even when the valve overlap period is set to any length, the intake valve open timing and the exhaust valve close timing are set such that the exhaust top dead center is interposed therebetween.

The advancement angle of the open timing of the intake valve 6 is larger than the retardation angle of the close timing of the exhaust valve 7. This is because, as the close timing of the exhaust valve 7 is retarded, a blowout amount of the intake air increases, so that cylinder volumetric efficiency is degraded. That is, if the valve overlap period increases by predominantly advancing the open timing of the intake valve 6 as described in this embodiment, it is possible to suppress degradation of the cylinder volumetric efficiency.

In step S109, the controller 100 executes ignition timing correction. This ignition timing correction is to compensate for a torque decrease caused by changing the valve overlap period. That is, as the valve overlap period increases, the inert gas proportion in the cylinder increases, and the torque decreases. Therefore, the decreased torque is compensated by advancing the ignition timing. The correction amount is calculated using the map described below on the basis of the valve overlap period and the intake air amount. Note that the intake air amount is calculated from a detection value of an air flowmeter (not shown).

Figure 7:
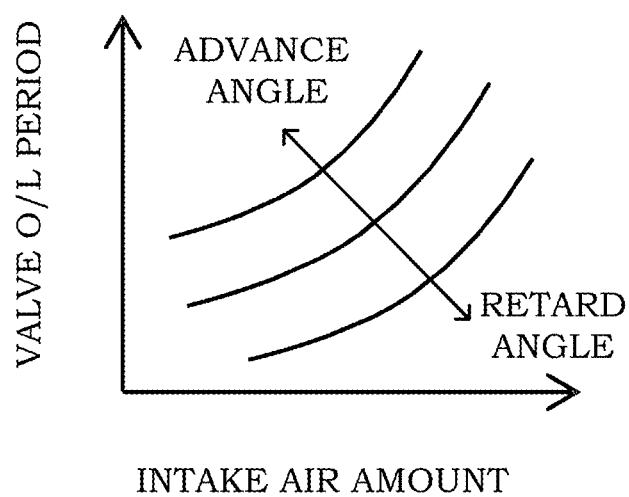
FIG. 7 is a map for correcting the ignition timing.

FIG. 7 is a map used to calculate the correction amount of the ignition timing in step S109. As illustrated in FIG. 7, as the intake air amount decreases, and the valve overlap period increases, the advancement angle of the ignition timing increases.

Next, a behavior of the piston crown surface temperature or the like when the aforementioned control is executed will be described.

Figure 8:
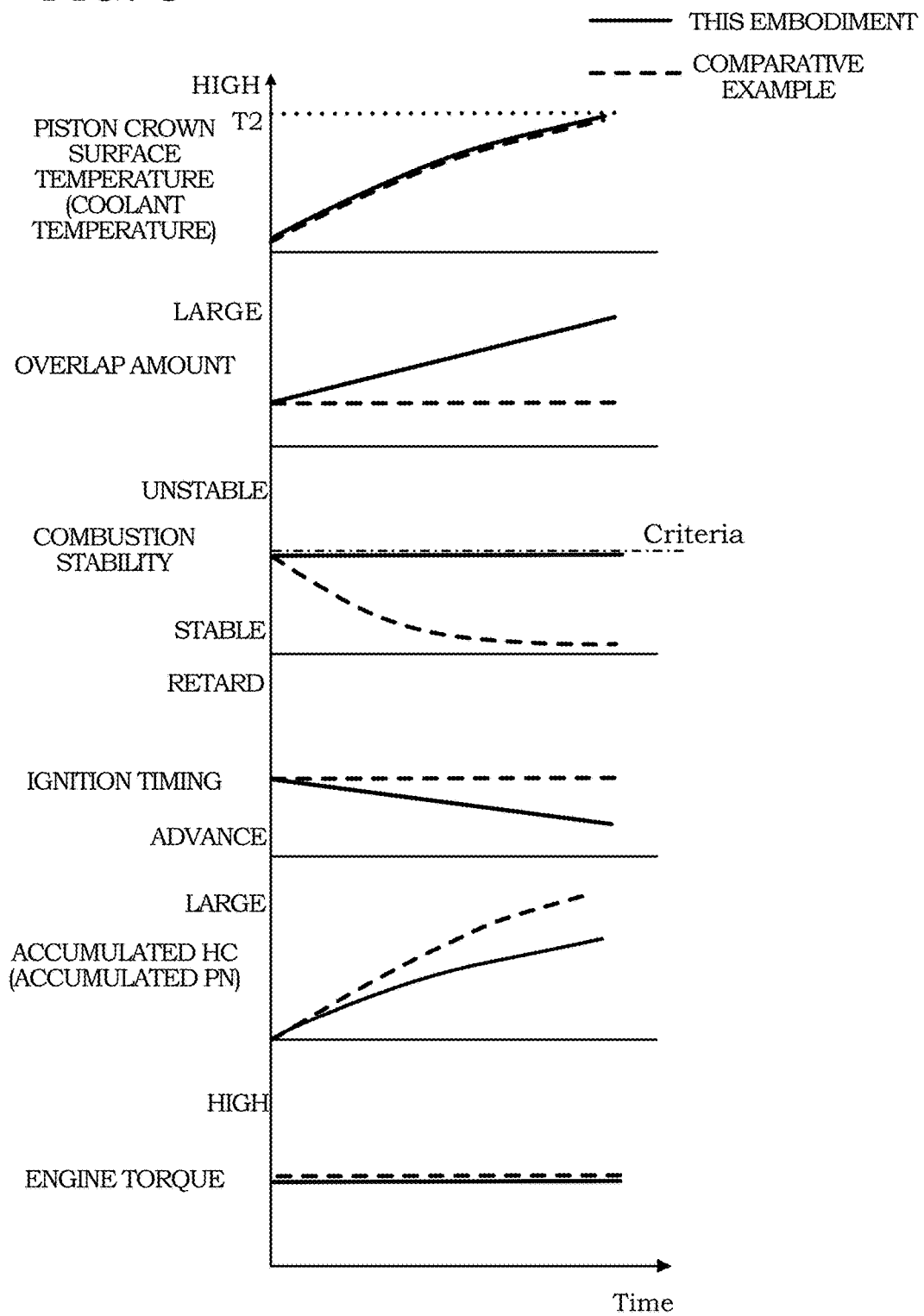
FIG. 8 is a timing chart when the control according to the first embodiment is executed.

FIG. 8 is a timing chart illustrating operations of the aforementioned control performed until the piston crown surface temperature reaches "T2" from the engine start.

The solid line in FIG. 8 indicates a case where the control according to this embodiment is executed. The dotted line in FIG. 8 indicates a comparative example in which the valve overlap period and the ignition timing for a cold engine operation set at the time of the engine start are not changed. However, the valve overlap period and the ignition timing at the time of the engine start in the comparative example are similar to those of the control according to this embodiment.

The piston crown surface temperature relates to a coolant temperature or a cylinder wall surface temperature. Therefore, the piston crown surface temperature in FIG. 8 may be considered as the coolant temperature or the cylinder wall surface temperature.

A threshold value of the combustion stability (Criteria in FIG. 8) is set predominantly on the basis of ride quality. The ride quality is degraded as the engine combustion becomes unstable, and vibration increases. In this regard, the combustion stability when the ride quality is at an acceptable level is set as the threshold value of the combustion stability.

Accumulated hydrocarbon (HC) refers to an accumulation value of an unburned HC discharge amount during an engine operation. Note that, since the accumulation value of the particulate number (PN) during an engine operation also exhibits a behavior similar to that of the chart of the accumulated HC, the accumulated PN chart may be considered as the accumulated HC chart.

The piston crown surface temperature gradually increases as time elapses after the engine start. Accordingly, according to this embodiment, the valve overlap period is set to gradually increase.

Figure 9:
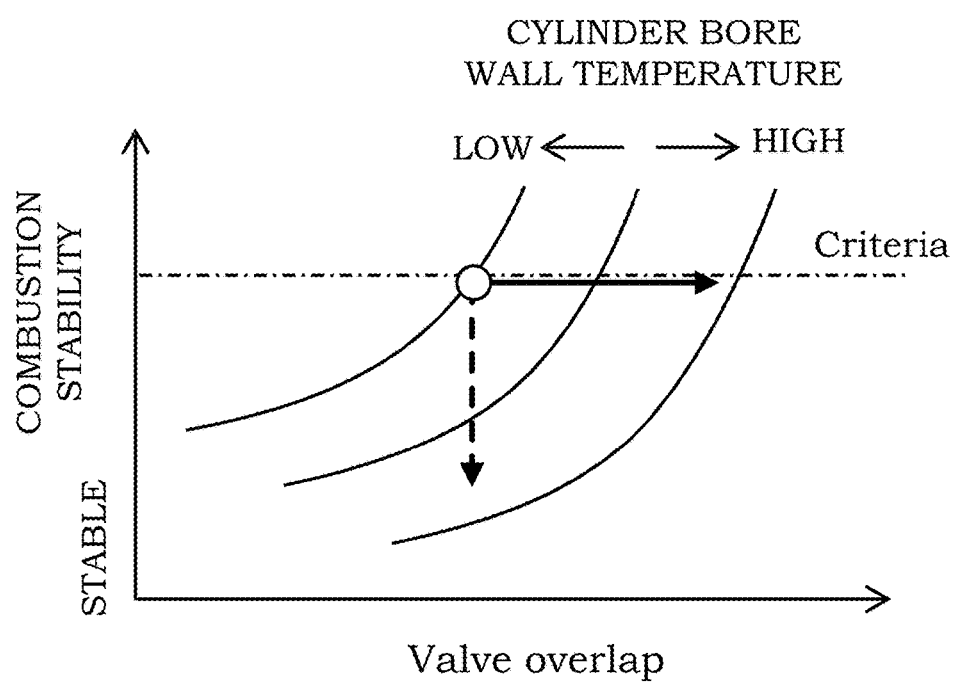
FIG. 9 is a map illustrating a relationship between a cylinder wall surface temperature, a valve overlap period, and a combustion stability.

As illustrated in FIG. 9, the combustion stability is improved as the cylinder wall surface temperature increases. Meanwhile, if the cylinder wall surface temperature is constant, the combustion stability is degraded as the valve overlap period increases as illustrated in FIG. 9. Therefore, similar to the comparative example, if the valve overlap period is constant, the combustion stability is improved as the cylinder wall surface temperature increases. In comparison, according to this embodiment, the valve overlap period gradually increases within a stable combustion range. Therefore, improvement of the combustion stability caused by increasing the cylinder wall surface temperature and degradation of the combustion stability caused by increasing the valve overlap period are compensated with each other, so that the combustion stability is maintained under the threshold value.

The accumulated HC (accumulated PN) increases in both this embodiment and the comparative example as time elapses. However, the accumulation amount of this embodiment is smaller than that of the comparative example. This is because the internal EGR amount increases by increasing the valve overlap period, so that vaporization of the fuel is promoted.

Note that an increase of the valve overlap period causes a decrease of the engine torque. However, according to this embodiment, the engine torque is maintained constant by advancing the ignition timing.

Next, effects of this embodiment will be described.

According to this embodiment, in a case where it is necessary to warm up the exhaust gas purifying catalyst inserted into the exhaust passage 5, the controller 100, during the compression stroke, performs a control such that the fuel is injected at the fuel injection timing at which the fuel spray collides with the piston crown surface 3A, and the colliding fuel spray is directed toward the ignition plug 8 depending on the shape of the piston crown surface 3A, and the catalyst warm-up operation in which spark ignition is performed after the compression top dead center (super-retard stratified charge combustion) is executed. In addition, during the execution of the super-retard stratified charge combustion, the controller 100 shortens the valve overlap period depending on the piston crown surface temperature. Since the internal EGR amount increases, and the internal cylinder temperature increases from the intake stroke as the valve overlap period increases, it is possible to promote vaporization of the liquid fuel according to this embodiment. As a result, it is possible to reduce the PN.

Note that, as the internal EGR amount increases, the exhaust gas amount blowing back to the intake port and flowing into the cylinder again increases. As a result, unburned HC or the like enclosed in the cylinder increases. Furthermore, as the enclosed unburned HC or the like is combusted in the next cycle, the unburned HC or PN amount is reduced. That is, according to this embodiment, it is possible to obtain an emission reduction effect by enclosing unburned HC or the like in the cylinder as described above.

According to this embodiment, as the piston crown surface temperature decreases, the increase amount of the valve overlap period is restricted. As the piston crown surface temperature decreases, the colliding fuel spray easily remains on the piston crown surface 3A. Therefore, according to this embodiment, it is possible to more reliably reduce the liquid fuel amount remaining on the piston crown surface 3A.

According to this embodiment, at least during execution of the warm-up operation (super-retard stratified charge combustion), a part of the fuel is injected even in the intake stroke. That is, two-stage injection is performed such that the fuel is injected in both the intake stroke and the compression stroke. The fuel injected in the intake stroke forms a homogeneous gas mixture leaner than the stoichiometric air-fuel ratio inside the combustion chamber 11. If spark ignition occurs in this state, combustion resistant to a disturbance is performed.

According to this embodiment, during the execution of the super-retard stratified charge combustion, the controller 100 advances the fuel injection timing as the estimation amount of the liquid fuel remaining on the piston crown surface 3A increases. By advancing the fuel injection timing, the amount of the fuel colliding with the piston crown surface 3A is reduced. Therefore, the liquid fuel amount remaining on the piston crown surface 3A is reduced. As a result, it is possible to reduce the PN.

According to this embodiment, in a case where the estimation amount of the liquid fuel remaining on the piston crown surface 3A exceeds the threshold value set on the basis of the emission regulation value of the exhaust gas particulate matter, the fuel injection timing is switched from the aforementioned injection at the timing in which the fuel spray is directed to the ignition plug to the intake stroke injection. By switching the fuel injection timing to the intake stroke injection, the fuel spray does not collide with the piston crown surface. Therefore, it is possible to suppress an increase of the liquid fuel remaining on the piston crown surface 3A.

According to this embodiment, as the estimation amount of the liquid fuel remaining on the piston crown surface 3A increases, the fuel injection timing slowly approaches the intake stroke. That is, as the liquid fuel estimation amount increases, the combustion mode is switched from the super-retard stratified charge combustion to the lean stratified charge combustion. As a result, it is possible to promote the warm-up operation of the exhaust gas purifying catalyst by virtue of the lean stratified charge combustion while suppressing an increase of the liquid fuel remaining on the piston crown surface 3A.

According to this embodiment, the advancement angle of the fuel injection timing described above is set to be larger as the piston crown surface temperature decreases. As the piston crown surface temperature decreases, the colliding fuel spray more easily remains on the piston crown surface 3A. Therefore, according to this embodiment, it is possible to more reliably reduce the amount of the liquid fuel remaining on the piston crown surface 3A.

Note that, in the flowchart of FIG. 2, the processing of step S106 may be executed earlier than the processing of steps S104 to S105.

Figure 10:
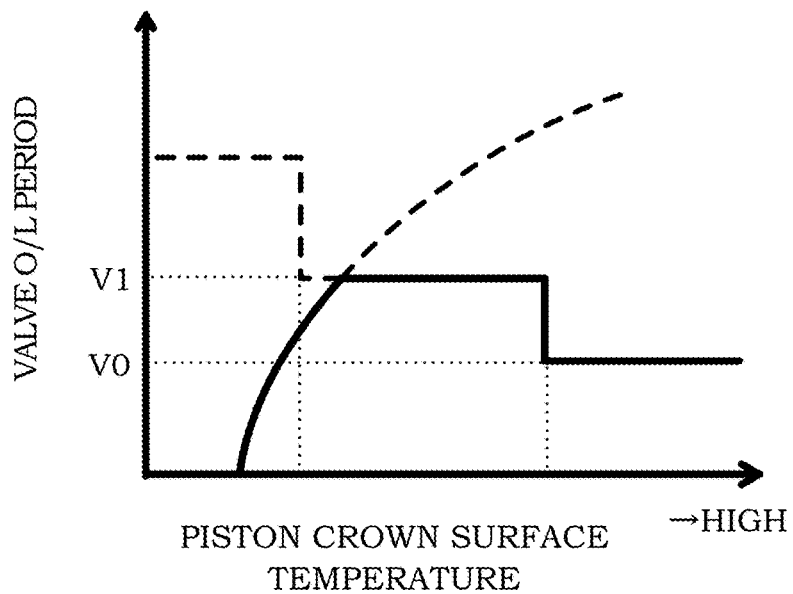
FIG. 10 is a table for setting a length of a valve overlap period used in a control according to a second embodiment.
Figure 11:
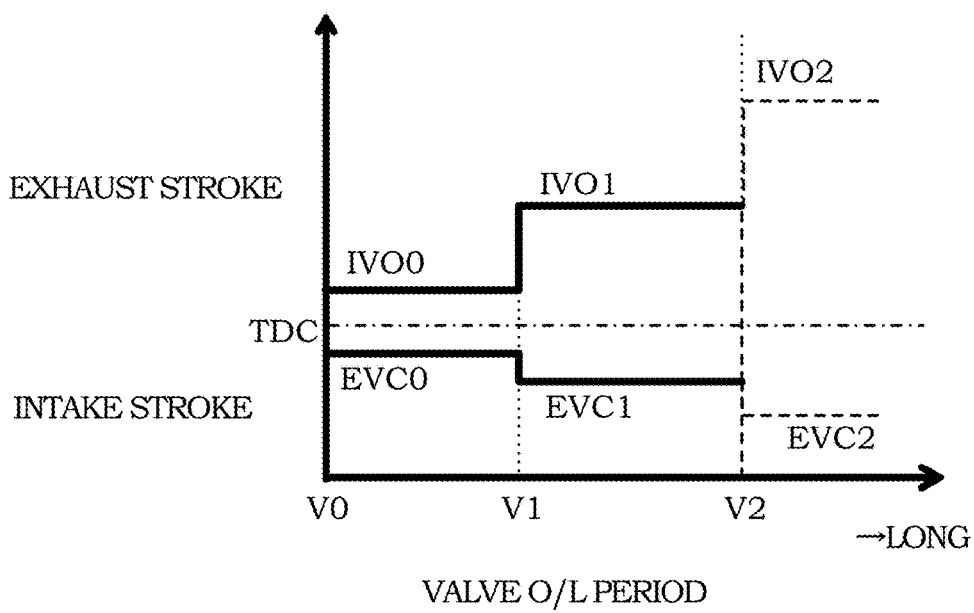
FIG. 11 is a table for setting a valve timing for implementing the valve overlap period calculated from the table of FIG. 10.

Instead of the tables of FIGS. 5 and 6, the tables of FIGS. 10 and 11 may be used.

That is, as illustrated in FIG. 10, the valve overlap period may change stepwise. In this case, as illustrated in FIG. 11, the valve timings of the intake valve 6 and the exhaust valve 7 also change stepwise.

Note that the embodiments described above are not limited to a case where the stratified charge combustion is performed through the two-stage split injection. For example, single-stage injection may be performed by omitting the first fuel injection of the two-stage fuel injection described above. Therefore, the stratified charge combustion may be performed through only the second fuel injection.

Figure 12:
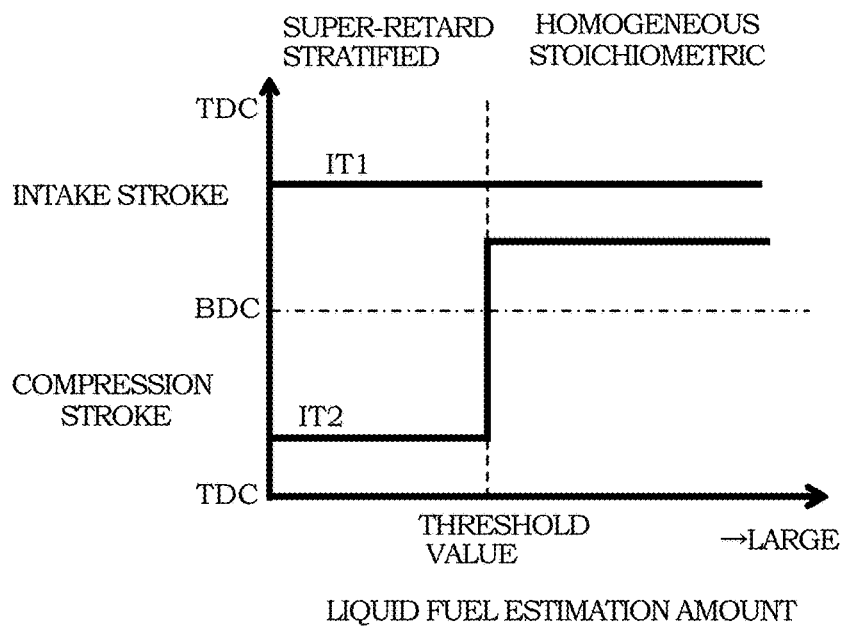
FIG. 12 is a diagram illustrating a fuel injection timing when a damper period is not provided.

As illustrated in FIG. 12, the controller 100 may switch the combustion mode to the homogeneous stoichiometric combustion when the liquid fuel estimation amount during execution of the super-retard stratified charge combustion becomes equal to or larger than a predetermined threshold value.

Figure 13:
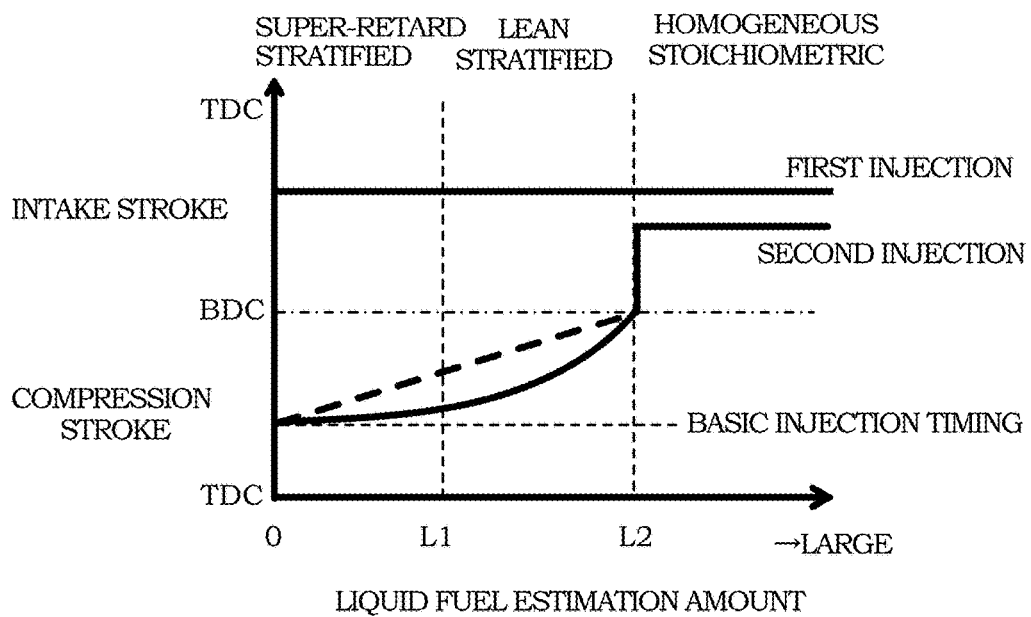
FIG. 13 is a diagram illustrating another example of the fuel injection timing.

The method "the fuel injection timing slowly approaches the intake stroke as the liquid fuel estimation amount increases" described above is not limited to a case where the fuel injection timing is advanced stepwise as illustrated in FIG. 4 or 12. For example, as indicated by the solid line or the dotted line in FIG. 13, the advancement angle of the fuel injection timing in a case where the liquid fuel estimation amount is smaller than the threshold value L2 may continuously increase as the liquid fuel estimation amount increases.

While the embodiments of the present invention have been described hereinbefore, the embodiments described above are just for illustrative purposes and are not intended to limit the technical scope of the present invention to a specific configuration of the embodiment.

The invention claimed is:

1. An engine control device for controlling a cylinder direct fuel injection type spark ignition engine provided with a fuel injection valve configured to directly inject fuel into a cylinder, a piston housed in the cylinder, an ignition plug configured to perform spark ignition for a gas mixture inside the cylinder, an intake valve, an exhaust valve, an exhaust passage, and an exhaust gas purifying catalyst provided in the exhaust passage, the device comprising:

a controller configured to:
   determine if the exhaust gas purifying catalyst requires to be warmed up;
   detect a piston crown surface temperature of the piston;
   perform a super-retard stratified charge combustion when it is determined that the exhaust gas purifying catalyst requires to be warmed up, by setting an ignition timing of the ignition plug within a first half of an expansion stroke while setting a first fuel injection timing of the direct injection injector to a first half of an intake stroke and setting a second fuel injection timing of the direct injection injector within a second half of a compression stroke; and
   increase a valve overlap period between the intake valve and the exhaust valve during the super-retard stratified charge combustion according to the piston crown surface temperature.

2. The engine control device according to claim 1, wherein the controller is further configured to:
   restrict an increase amount of the valve overlap period within a range in which the engine can perform stable combustion.

3. An engine control method for controlling a cylinder direct fuel injection type spark ignition engine provided with a fuel injection valve configured to directly inject fuel into a cylinder, a piston housed in the cylinder, an ignition plug configured to perform spark ignition for a gas mixture inside the cylinder, an intake valve, an exhaust valve, an exhaust passage, and an exhaust gas purifying catalyst provided in the exhaust passage, the method comprising:
   determining that the exhaust gas purifying catalyst requires to be warmed up;
   detecting a piston crown surface temperature of the piston;
   responsive to determining that the exhaust gas purifying catalyst requires to be warmed up, performing a super-retard stratified charge combustion by setting an ignition timing of the ignition plug within a first half of an expansion stroke while setting a first fuel injection timing of the direct injection injector to a first half of an intake stroke and setting a second fuel injection timing of the direct injection injector within a second half of a compression stroke; and
   increasing a valve overlap period between the intake valve and the exhaust valve during the super-retard stratified charge combustion according to the piston crown surface temperature.

4. The engine control device according to claim 1, wherein the controller is further configured to increase the valve overlap period when the piston crown surface temperature increases to a predetermined temperature and decrease the valve overlap period when the piston crown surface temperature increases beyond the predetermined temperature, during the super-retard stratified charge combustion.

5. The engine control method according to claim 3, further comprising increasing the valve overlap period when the piston crown surface temperature increases to a predetermined temperature and decreasing the valve overlap period when the piston crown surface temperature increases beyond the predetermined temperature, during the super-retard stratified charge combustion.

* * * * *